(12) United States Patent
Freese et al.

(10) Patent No.: US 8,994,496 B2
(45) Date of Patent: Mar. 31, 2015

(54) ENCRYPTED COMMUNICATIONS FOR A MOVEABLE BARRIER ENVIRONMENT

(75) Inventors: Theodore Brent Freese, Sugar Grove, IL (US); Randall Lee Planck, South Elgin, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 325 days.

(21) Appl. No.: 13/078,529

(22) Filed: Apr. 1, 2011

(65) Prior Publication Data
US 2012/0249289 A1    Oct. 4, 2012

(51) Int. Cl.
*G05B 19/00*        (2006.01)
*G08B 13/08*        (2006.01)
(Continued)

(52) U.S. Cl.
CPC ........ *G08C 17/00* (2013.01); *G05B 2219/2628* (2013.01); *E05F 15/00* (2013.01); *E05Y 2900/106* (2013.01); *G07C 9/00817* (2013.01); *G08C 2201/62* (2013.01)
USPC ........ 340/5.7; 340/5.71; 340/545.1; 160/310; 49/72

(58) Field of Classification Search
CPC ............... E05F 15/00; E05F 2011/00; E05F 2700/02–2700/04; E05F 15/1607; E05F 2015/00; E05F 2700/00; F05F 15/10; E05Y 2900/106; E05Y 2900/11; E05Y 2900/40; E05Y 2201/00; E05Y 2201/60; E05Y 2900/00; E05Y 2900/60; G08C 13/00; G08C 13/02; G08C 17/00; G08C 17/04; G08C 19/00; G08C 19/38; G08C 2201/20; G08C 201/32; G08C 2201/40; G08C 2201/51; G08C 2201/62; G05B 19/0428; G05B 2219/2628; G05B 19/02; G07C 2009/00928
USPC ................... 340/5.7, 5.71, 5.61, 5.51, 539.1, 340/825.69, 545.1, 545.8, 550; 49/13, 31, 49/72, 166; 455/403, 466, 557; 318/16, 318/286, 466; 160/310, 331; 52/1
See application file for complete search history.

(56) References Cited

U.S. PATENT DOCUMENTS 4,408,251 A    10/1983   Kaplan
4,583,081 A    4/1986    Schmitz
(Continued)

FOREIGN PATENT DOCUMENTS

EP    0422190    10/1990
EP    846991     6/1998
(Continued)

OTHER PUBLICATIONS

Examination Report Under Section 18(3) Dated May 29, 2013 from British Patent Application No. GB1205649.5.
(Continued)

*Primary Examiner* — Mirza Alam
(74) *Attorney, Agent, or Firm* — Fitch Even Tabin & Flannery LLP

(57) ABSTRACT

An at least partially secure communication environment is provided in which accessory devices can be communicated with and controlled in the context of a movable barrier operator system. In one example approach, a gateway device can be configured to coordinate and control such communications in a secure manner. Three example approaches to such a communication environment include: a gateway device's receiving an accessory device control signal and sending a rolling code based accessory command signal to a target accessory device; receiving a rolling code based accessory device control signal and sending a command signal to an accessory device; and receiving a rolling code based accessory device control signal and sending a rolling code based accessory command signal to a target accessory device. Combinations are possible. An integrated system provides for automatic functioning of one device in response to status changes of one or more other devices.

20 Claims, 8 Drawing Sheets

(51) Int. Cl.
- *A47H 1/00* (2006.01)
- *E06B 7/00* (2006.01)
- *G08C 17/00* (2006.01)
- *E05F 15/00* (2006.01)
- *G07C 9/00* (2006.01)

(56) References Cited

U.S. PATENT DOCUMENTS

| | | | |
|---|---|---|---|
| 4,629,874 A | 12/1986 | Pugsley | |
| 4,922,224 A | 5/1990 | Drori | |
| 5,047,928 A | 9/1991 | Wiedemer | |
| 5,155,680 A | 10/1992 | Wiedemer | |
| 5,191,268 A | 3/1993 | Duhame | |
| 5,402,105 A | 3/1995 | Doyle | |
| 5,565,843 A | 10/1996 | Meyvis | |
| 5,596,840 A | 1/1997 | Teich | |
| 5,656,900 A | 8/1997 | Michel | |
| 5,731,756 A | 3/1998 | Roddy | |
| 5,780,987 A | 7/1998 | Fitzgibbon | |
| 5,805,064 A | 9/1998 | Yorkey | |
| 6,028,537 A * | 2/2000 | Suman et al. | 340/988 |
| 6,127,740 A | 10/2000 | Roddy et al. | |
| 6,131,019 A | 10/2000 | King | |
| 6,184,641 B1 * | 2/2001 | Crimmins et al. | 318/466 |
| 6,192,282 B1 | 2/2001 | Smith | |
| 6,266,540 B1 * | 7/2001 | Edgar et al. | 455/557 |
| 6,278,249 B1 * | 8/2001 | Fitzgibbon et al. | 318/268 |
| 6,346,889 B1 | 2/2002 | Moss | |
| RE37,784 E | 7/2002 | Fitzgibbon | |
| 6,484,784 B1 * | 11/2002 | Weik, III et al. | 160/7 |
| 6,553,881 B2 | 4/2003 | Marmin | |
| 6,561,255 B1 | 5/2003 | Mullet | |
| 6,564,056 B1 | 5/2003 | Fitzgerald | |
| 6,661,340 B1 | 12/2003 | Saylor et al. | |
| 6,686,838 B1 | 2/2004 | Rezvani | |
| 6,781,516 B2 | 8/2004 | Reynard et al. | |
| 6,782,662 B2 | 8/2004 | McCartney | |
| 6,812,849 B1 | 11/2004 | Ancel | |
| 6,833,681 B2 | 12/2004 | Fitzgibbon | |
| 6,891,838 B1 | 5/2005 | Petite | |
| 6,933,843 B1 | 8/2005 | Hom et al. | |
| 6,975,226 B2 | 12/2005 | Reynard et al. | |
| 6,989,760 B2 | 1/2006 | Dierking | |
| 6,998,977 B2 | 2/2006 | Gregori | |
| 7,057,494 B2 | 6/2006 | Fitzgibbon | |
| 7,071,850 B1 | 7/2006 | Fitzgibbon et al. | |
| 7,091,688 B2 | 8/2006 | Gioia | |
| 7,127,847 B2 | 10/2006 | Fitzgibbon | |
| 7,161,319 B2 | 1/2007 | Ergun | |
| 7,161,466 B2 | 1/2007 | Chuey | |
| 7,192,278 B2 | 3/2007 | Harwood et al. | |
| 7,197,278 B2 | 3/2007 | Harwood | |
| 7,221,289 B2 | 5/2007 | Horn | |
| 7,274,300 B2 | 9/2007 | Duvernell et al. | |
| 7,331,144 B2 * | 2/2008 | Parsadayan | 52/1 |
| 7,332,999 B2 | 2/2008 | Fitzgibbon | |
| 7,370,074 B2 | 5/2008 | Alexander | |
| 7,464,403 B2 | 12/2008 | Hardman, Jr. | |
| 7,468,676 B2 | 12/2008 | Styers | |
| 7,482,923 B2 | 1/2009 | Fitzgibbon | |
| 7,493,726 B2 * | 2/2009 | Fitzgibbon et al. | 49/31 |
| 7,561,075 B2 | 7/2009 | Fitzgibbon et al. | |
| 7,741,951 B2 | 6/2010 | Fitzgibbon | |
| 7,761,186 B2 | 7/2010 | Keller et al. | |
| 7,778,604 B2 | 8/2010 | Bauman et al. | |
| 7,852,212 B2 | 12/2010 | Fitzgibbon | |
| 7,876,218 B2 | 1/2011 | Fitzgibbon | |
| 7,983,180 B2 * | 7/2011 | Harrington et al. | 370/252 |
| 7,994,896 B2 | 8/2011 | Fitzgibbon | |
| 7,995,460 B2 * | 8/2011 | Edgar et al. | 370/216 |
| 8,040,217 B2 * | 10/2011 | Fitzgibbon | 340/5.71 |
| 8,063,592 B2 | 11/2011 | Shier | |
| 8,144,011 B2 | 3/2012 | Fitzgibbon | |
| 8,175,591 B2 | 5/2012 | Fitzgibbon | |
| 8,207,818 B2 | 6/2012 | Keller, Jr. | |
| 8,239,481 B2 | 8/2012 | Alexander | |
| 8,290,515 B2 | 10/2012 | Staton | |
| 8,368,509 B2 | 2/2013 | Fitzgibbon | |
| 8,416,054 B2 | 4/2013 | Fitzgibbon | |
| 8,797,138 B2 | 8/2014 | Myers | |
| 2001/0011941 A1 | 8/2001 | King et al. | |
| 2002/0014954 A1 | 2/2002 | Fitzgibbon | |
| 2002/0183008 A1 | 12/2002 | Menard | |
| 2003/0216139 A1 | 11/2003 | Olson | |
| 2004/0036573 A1 | 2/2004 | Fitzgibbon | |
| 2004/0212498 A1 | 10/2004 | Peterson | |
| 2004/0257189 A1 | 12/2004 | Chang | |
| 2004/0257199 A1 | 12/2004 | Fitzgibbon | |
| 2005/0012631 A1 | 1/2005 | Gregori | |
| 2005/0033641 A1 | 2/2005 | Jha | |
| 2005/0076242 A1 | 4/2005 | Breuer | |
| 2005/0113080 A1 | 5/2005 | Nishimura | |
| 2005/0134426 A1 | 6/2005 | Mullet et al. | |
| 2005/0170777 A1 | 8/2005 | Harwood et al. | |
| 2005/0174250 A1 | 8/2005 | Dierking | |
| 2005/0195066 A1 * | 9/2005 | Vandrunen et al. | 340/5.7 |
| 2005/0272372 A1 | 12/2005 | Rodriguez | |
| 2005/0273372 A1 | 12/2005 | Bowne | |
| 2006/0077035 A1 | 4/2006 | Mamaloukas | |
| 2006/0103503 A1 | 5/2006 | Rodriguez | |
| 2006/0132284 A1 | 6/2006 | Murphy | |
| 2006/0137261 A1 | 6/2006 | Maly | |
| 2006/0158344 A1 | 7/2006 | Bambini et al. | |
| 2006/0223518 A1 | 10/2006 | Haney | |
| 2006/0261932 A1 | 11/2006 | Ando | |
| 2006/0279399 A1 | 12/2006 | Chuey | |
| 2007/0005605 A1 | 1/2007 | Hampton | |
| 2007/0028339 A1 | 2/2007 | Carlson | |
| 2007/0058811 A1 | 3/2007 | Fitzgibbon et al. | |
| 2007/0146118 A1 * | 6/2007 | Rodriguez et al. | 340/5.71 |
| 2007/0177740 A1 | 8/2007 | Nakajima | |
| 2007/0183597 A1 | 8/2007 | Bellwood et al. | |
| 2007/0185597 A1 | 8/2007 | Bejean | |
| 2008/0061926 A1 | 3/2008 | Strait | |
| 2008/0108301 A1 | 5/2008 | Dorenbosch | |
| 2008/0303706 A1 | 12/2008 | Keller | |
| 2009/0102651 A1 | 4/2009 | Fitzgibbon | |
| 2009/0160637 A1 | 6/2009 | Maeng | |
| 2009/0302997 A1 | 12/2009 | Bronstein | |
| 2010/0242360 A1 | 9/2010 | Dyas | |
| 2010/0242369 A1 | 9/2010 | Laird | |
| 2010/0289661 A1 | 11/2010 | Styers | |
| 2010/0299517 A1 | 11/2010 | Jukic et al. | |
| 2011/0055909 A1 | 3/2011 | Dowlatkhah | |
| 2011/0084798 A1 | 4/2011 | Fitzgibbon | |
| 2011/0109426 A1 | 5/2011 | Harel | |
| 2011/0130134 A1 | 6/2011 | VanRysselberghe | |
| 2011/0193700 A1 | 8/2011 | Fitzgibbon | |
| 2011/0234367 A1 | 9/2011 | Murphy | |
| 2011/0254685 A1 | 10/2011 | Karasek | |
| 2011/0311052 A1 | 12/2011 | Myers | |
| 2013/0060357 A1 | 3/2013 | Li | |
| 2013/0060358 A1 | 3/2013 | Li | |
| 2013/0151977 A1 | 6/2013 | Arteaga-King | |
| 2013/0290191 A1 | 10/2013 | Dischamp | |
| 2013/0328663 A1 | 12/2013 | Ordaz | |

FOREIGN PATENT DOCUMENTS

| | | |
|---|---|---|
| EP | 1151598 | 6/2000 |
| WO | 9012411 | 10/1990 |
| WO | 0036812 | 6/2000 |
| WO | WO0193220 | 12/2001 |
| WO | 2009088901 | 7/2009 |

OTHER PUBLICATIONS www.brinkshomesecurity.com/home-security-systems-and-pricing/security-equipment/secuirty-equipment.htm as printed on Feb. 11, 2009.

British Patent Application No. GB1205649.5 Combined Search and Examination Report Dated Aug. 8, 2012.

(56) References Cited

OTHER PUBLICATIONS

"Now You Can Close Your Garage Door With a Smartphone;" Copyright 2011 USA Today; http://content.usatoday.com/communities/driveon/post/2011/09/now-you-can-control-your-garage-door-from-your-smartphone.
828LM—LiftMaster Internet Gateway; http://www.liftmastercom/consumerweb/pages/accessoriesmodeldetailLaspx?modelld=2407; printed Oct. 30, 2012.
ActieHome PC Home Automation System; http://www.x10.com/promotions/sw31a_activehome_hmp.html?WENTY11; accessed Sep. 2011.
Arrayent; White Paper: Six System Requirements for an Internet-Connected Product Line; Copyright 2010; http://arrayent.com/pdfs/SixSystemRequirementsforInternetConnectedProductsLine.pdf.
Automatic Garage Door Closer Manual—Protectrix 18A—Dated Mar. 31, 2009.
Bill Peisel; "Designing the Next Step in Internet Applicances" Electronic Design/Mar. 23, 1998.
Examination Report Dated Apr. 3, 2012 issuing from New Zealand Patent Application No. 599055.
Examination Report from New Zealand Patent Application No. 599055 dated Apr. 3, 2012.
EZSrve-Insteon/X10 Home Automation Gateway—Model #5010L; hap://www.simplehomenet.com/proddetail.asp?prod+9357342317, accessed Sep. 2011.
Fully-Loaded ActiveHome Pro PC Hom Automation System; http://www.x10.com/promotions/cm15a_loaded_ps.html; accessed Sep. 2011.
George Lawton; "Dawn of the Internet Appliance" Computer, Industry Trends; Oct. 1, 1997.
Hassan A. Artail; "A Distributed System of Network-Enabled Microcontrollers for Controlling and Monitoring Home Devices" IEEE 2002.
Hawking Technologies HomeRemote Wireless Home Automation Gateway Pro Starter Kit; The HRGZ2 HomeRemote Gateway; Smart Home Systems, Inc.; http://www.smarthomeusa.com/ShopByManufacturer/Hawking-Technologies/Item/HRPS1/; Accessed Sep. 2011.
HomeRemote Wireless Home Automation Gateway—PracticallyNetworked.com; Review date Aug. 2007; http://222.practicallynetworked.com/review.asp?pid=690; Accessed Sep. 2011.
HomeSeer HS2—Home Automation Software; http://store.homeseer.com/store/HomeSeer-HS2-Home-Automation-Software-Download-P103.aspx; Accessed Sep. 2011.
How to Internet-Connect Your Low Cost Consumer Retail Embedded Design; How to Prototype an Internet Connect Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; How to Prototype an Internet Connected Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; Internet Connect Product Implementation Design Patterns; Hershy Wanigasekara; Sep. 13, 2010; http://www.eetimes.com/design/embedded/4027637/Internet-Connect-your-low-cost-consumer-retail-embedded-design.
Ian Bryant and Bill Rose; "Home Systems: Home Controls;" p. 1-322; © 2001 Parks Associates.
Infinias Mobile Credential App for Android DroidMill; Known and printed as early as Dec. 19, 2011; http://droidmill.com/infinias-mobile-credential-1364120.html.
Intelli-M eIDC32; Ethernet-Enabled Integrated Door Controller; www.infinias.com; Known and printed as early as Dec. 19, 2011.
Internet Connected Garage Door Opener; Open New Doors at Sears; http://www.sears.corri/shc/s/p_10153_12605_00930437000P?prdNo=l&blockNo=1&blockType=G1; printed Oct. 30, 2012.

K.K. Tan, Y.L. Lim and H.L. Goh; "Remote Adaptive Control and Monitoring" IEEE (c) 2002.
Kenmore Connect; http:/www.kenmore.com/shc/s/dap_10154_12604_DAP_Kenmore+Connect; 2010 Sears Brands, LLC.
Kurt Scherf, Michael Greeson and Tricia Parks; "Primary Perspectives: "E-Enabled" Home Security;" pp.1-87; © 2003 Parks Associates.
LiftMaster; MyQ Enabled Accessory: LiftMaster Internet Gateway (Model 828); Known as of Dec. 19, 2011.
Liftmaster Debuts New Intelligence in Garage Door Openers at IDS 2011; New Generation of LiftMaster Models and Accessories Enabled by MyQ Technology; Elmhurst, IL; Jun. 7, 2011; http://www.liftmaster.com/NR/rdonlyres/0A903511-21AB-4F0A-BBCD-196D41503CF2/4305/LiftMasterUneilsMyQTechnologyIDA2011_FINAL/pdf.
LiftMaster Internet Gateway: Your Simple Solution to Home Contol; http://www.liftmaster.com/consumerweb/products/IntroducingLiftMasterInternetGateway, printed Oct. 30, 2012.
MiCasa Verde.com—Vers2; http://www.micasaverde.com/vera.php; Accessed Sep. 2011.
Miele's Remote Vision Explained; http://www.miclensa.com/service/remote_vision/verify.aspx; Accessed Feb. 2012.
Peter M. Corcoran and Joe Desbonnet; "Browser-Style Interfaces to a Home Automation Network" Manuscript received Jun. 18, 1997, IEEE (c) 1997.
Press Release; Kenmore Uneils Reolutionary Technology Enabling Laundry Applicances to 'Talk' to Customer Serice Experts; PR Newswire, pNA, Aug. 4, 2010.
Protectrix Wireless automatic Garage Door Closer Timer Opener Security Accessory; http://www.closethegarage.com; printed Oct. 30, 2012.
Somfy's Slick Tahoma Z-Wire and RTS Home Automatation Gateway; Thomas Ricker; posted Janaury 4, 2011; http://www.engadget.com/2011/01/04/softys-tahoma-z-wave-and-rts-home-automation-gateway/.
Stephen Shankland; "Need to lend your key? E-Mail it, Frauhofer says" news.cnet.com/8301-1035_3-57572338-94/need-to-lend-your-key-e-mail-it-fraunhofer-says/; pp. 1-5; CNET News, Mar. 4, 2013.
Summary of Findings From Parks Associates\ Early Reports; pp. 9-13; Apr. 15, 2013 by Parks Associates.
Susan Cotterell, Frank Vahid, Walid Najjar, and Harry Hsieh; "First Results with eBlocks: Embedded Systems Building Blocks" University of California, Rkverside pp. 168-175; Codes+ISSS'03, Oct. 1-3, 2003.
The Craftsman Brant Announces Garage Door Opener of the Future—PR Newswire; The Sacramento Bee; http://www.sac bee.com/2011/09/27/2941742/the-craftsman-brand-announces.html; Sep. 27, 2011.
The Intelli-M eIDC32; True IP Access Control; htto://www.infinias.com/main/Products/eIDCController.aspx; Known and printed as early as Dec. 19, 2011.
UL Standard for Safety for Door, Drapery, Gate, Louver, and Window Operators and Systems, UL 325 Fifth Edition, Dated Jun. 7, 2002; pp. 1-186.
Universal Devices—ISY-99i Series; http://www.universal-devices.com/99i.htm; Accessed Sep. 2011.
Wayne-Dalton Press Area—New Z-Wave enabled prodrive; http://www.wayne-dalton.com/newsitem98.asp; Printed Oct. 13, 2011.
Xanboo XPC280 Wireless Universal Garage Door Control—Smarthome; http://www.smarthome.comf75066/Xanboo-XPC280-Wireless-Universal-Garage-Door-Control/p.aspx, printed Oct. 30, 2012.
Canadian Patent Application No. 2,533,795; Second Office Action Dated Dec. 30, 2013.
Examination Report Under Section 18(3) for GB1205649.5 Dated Feb. 12, 2014.
Examination Report Under Section 18(3) for GB1205649.5 Dated Jun. 11, 2014.

\* cited by examiner

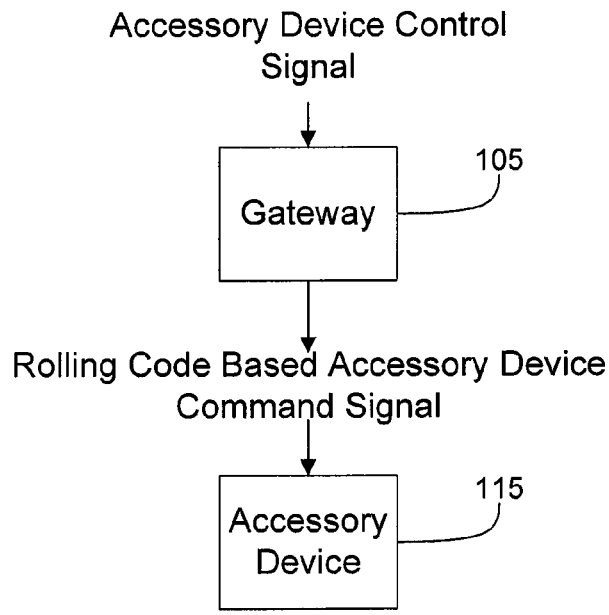
FIG. 4
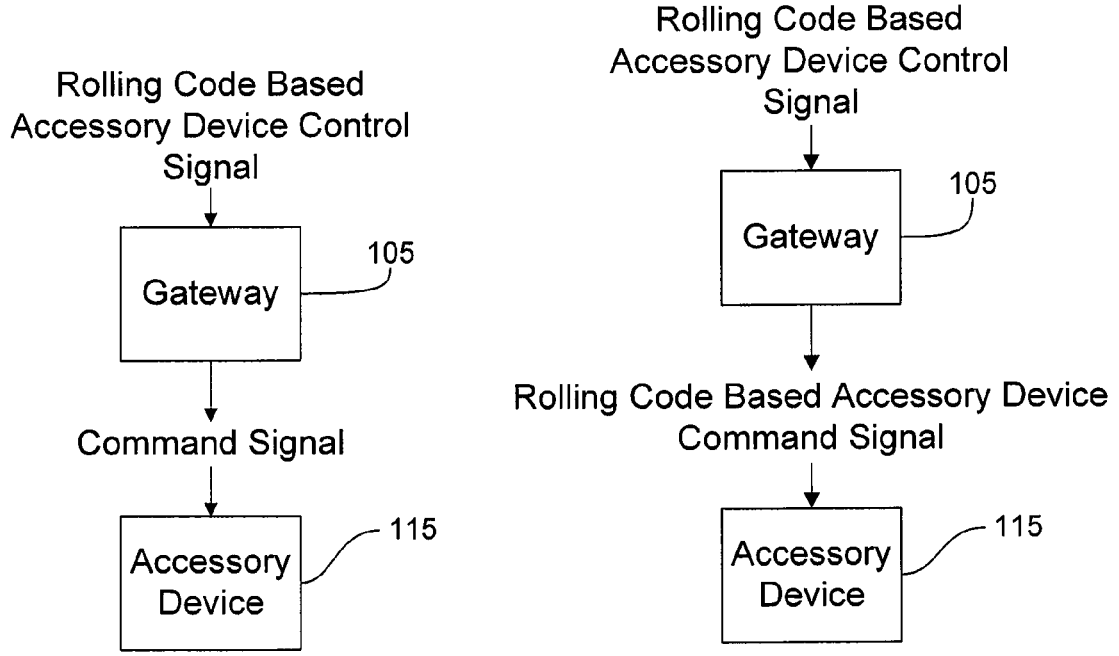
FIG. 5
FIG. 6

ENCRYPTED COMMUNICATIONS FOR A MOVEABLE BARRIER ENVIRONMENT

TECHNICAL FIELD

This invention relates generally to secure communications among devices, and more particularly, encrypted communications among devices in a movable barrier operation.

BACKGROUND

The number of devices that operate in the context of a movable barrier, such as a residential garage or a commercial door setting in a warehouse, is increasing as users seek additional features to be incorporated into the operation of the movable door. For example, in a residence garage, movable barrier systems may operate in conjunction with one or more lighting systems, safety sensors such as photo-eyes, and motion sensors. In a warehouse setting, even more devices are operated in conjunction with a movable barrier at a loading dock for a warehouse.

Many of these devices are operated through the use of separate control devices, many of which communicate with individual devices through wired or wireless communications. Given the increased number of devices being controlled and the types of devices being controlled, safety and security risks can increase with the increasing amount of information being transferred among devices and control apparatuses. For instance, an unauthorized person's capturing these communications can result in one or more the loss of confidential data, breaches in facility security, product theft, or the disruption of facility processes. For example, mis-signaling in a warehouse context could lead to the malfunctioning of one or more devices that are applied at a truck loading zone with a resulting failure in security.

SUMMARY

Generally speaking and pursuant to these various embodiments, apparatuses and methods are described herein that provide for an at least partially secure communication environment in which accessory devices can be communicated with and controlled in the context of a movable barrier operator system. In one example approach, a gateway device can be configured to coordinate and control such communications in a secure manner. Three example approaches to such a communication environment include: (1) a gateway device's receiving an accessory device control signal and then sending a rolling code based accessory command signal to a target accessory device; (2) the gateway device's receiving a rolling code based accessory device control signal and sending a command signal to an accessory device; and (3) the gateway device's receiving a rolling code based accessory device control signal and sending a rolling code based accessory command signal to a target accessory device. Combinations of the above three described approaches are also possible.

The gateway device may be a separate element located in the context of a movable barrier environment or may be built in to one or more other devices normally located in a movable barrier environment. For example, the gateway device may be built into a movable barrier operator or a separate user interface device disposed near the movable barrier. In certain approaches, the gateway device is configured to communicate through a network with a separate central controller or other controller to exchange information. So configured, the gateway device can be provided to retrofit and be combined with a preexisting movable barrier environment or may be custom built into a newly provided movable barrier environment.

Adding a rolling code based encryption to one or both of the accessory device control signal and an accessory command signal provides increased security and, in some approaches, increased control over various devices in a movable barrier operator setting. One such rolling code approach is described in U.S. patent application Ser. No. 11/501,455 filed on Aug. 9, 2006, which application is incorporated by reference as if fully rewritten herein. In various approaches, the rolling code can vary at the system level, be specific to a particular accessory, be specific to each accessory, or be specific to the movable barrier.

So configured, a given movable barrier operation environment can implement one or more of the above described methods to provide varying levels of security and control. For instance, a newly installed commercial door operation system can be installed whereby every accessory device associated with the particular door operates using rolling code based control and command signals. By another approach, a given commercial door system can be retrofitted whereby certain portions of the communications between devices in that environment use rolling code based communications and other portions of the communication systems do not. Even in such an example, increased security is realized through the implementation of rolling code based encryption over the portions of the communication system for a given movable barrier environment.

BRIEF DESCRIPTION OF THE DRAWINGS

The above is at least partially met through provision of the encrypted communications for a movable barrier environment described in the following detailed description, particularly when studied in conjunction with the drawings wherein:

FIGS. 4, 5, and 6 comprise flow diagrams of example communication flows as configured in accordance with various embodiments of the invention;

Skilled artisans will appreciate the elements and the figures are illustrated for simplicity and clarity and have not necessarily been drawn to scale. For example, the dimensions and/or relative positioning of some of the elements in the figures may be exaggerated relative to other elements to help improve understanding of various embodiments. Also common, but well understood elements that are useful or necessary in a commercially feasible embodiment are often not depicted to facilitate a less obstructed view of these various embodiments. It will further be appreciated that certain actions and/or steps may be described or depicted in a particular order of occurrence, while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific means have otherwise been set forth herein.

DETAILED DESCRIPTION

Figure 1:
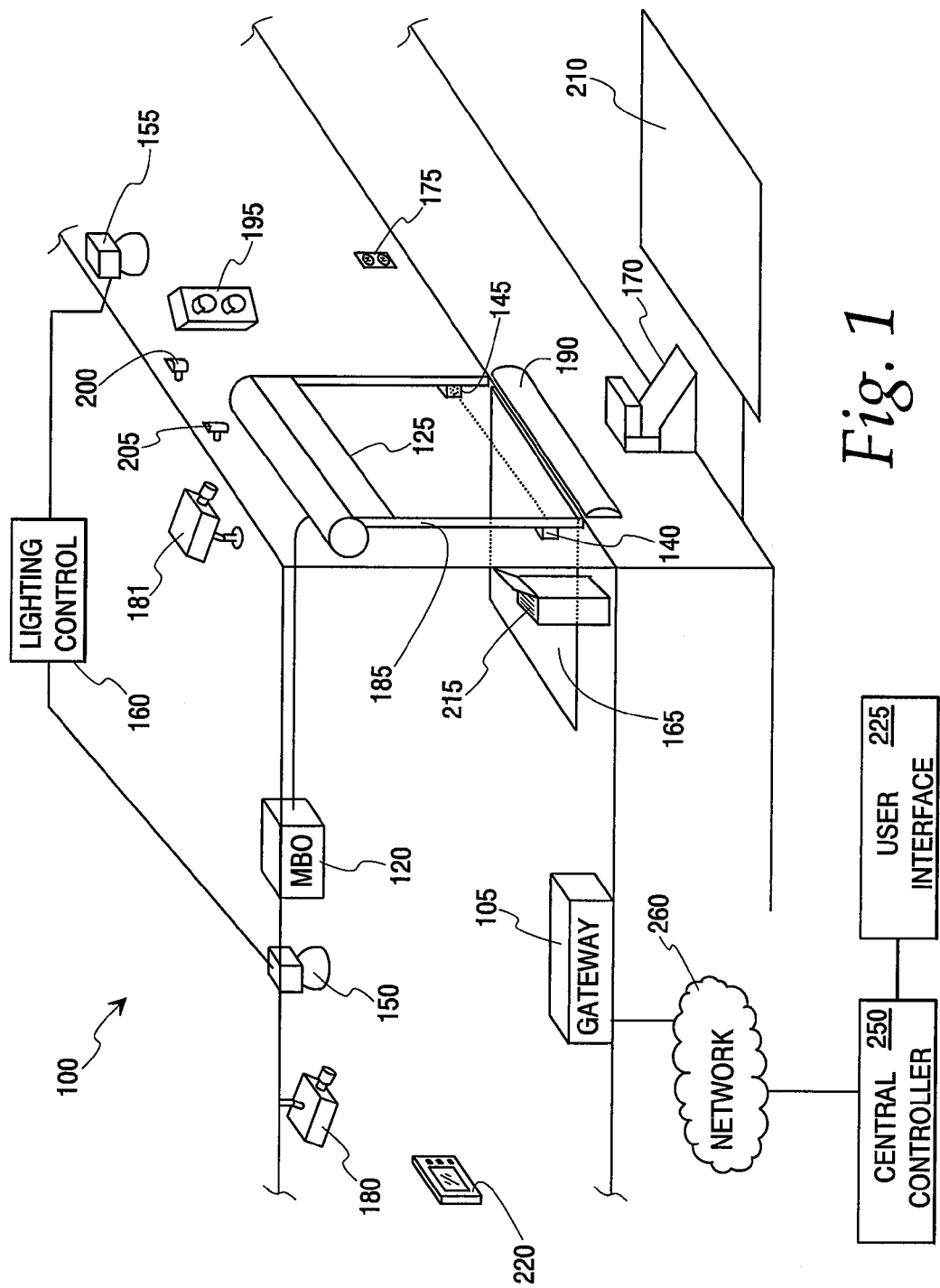
FIG. 1 comprises a perspective view of an example commercial loading dock with a movable barrier and accessory devices configured in accordance with various embodiments of the invention.
Figure 2:
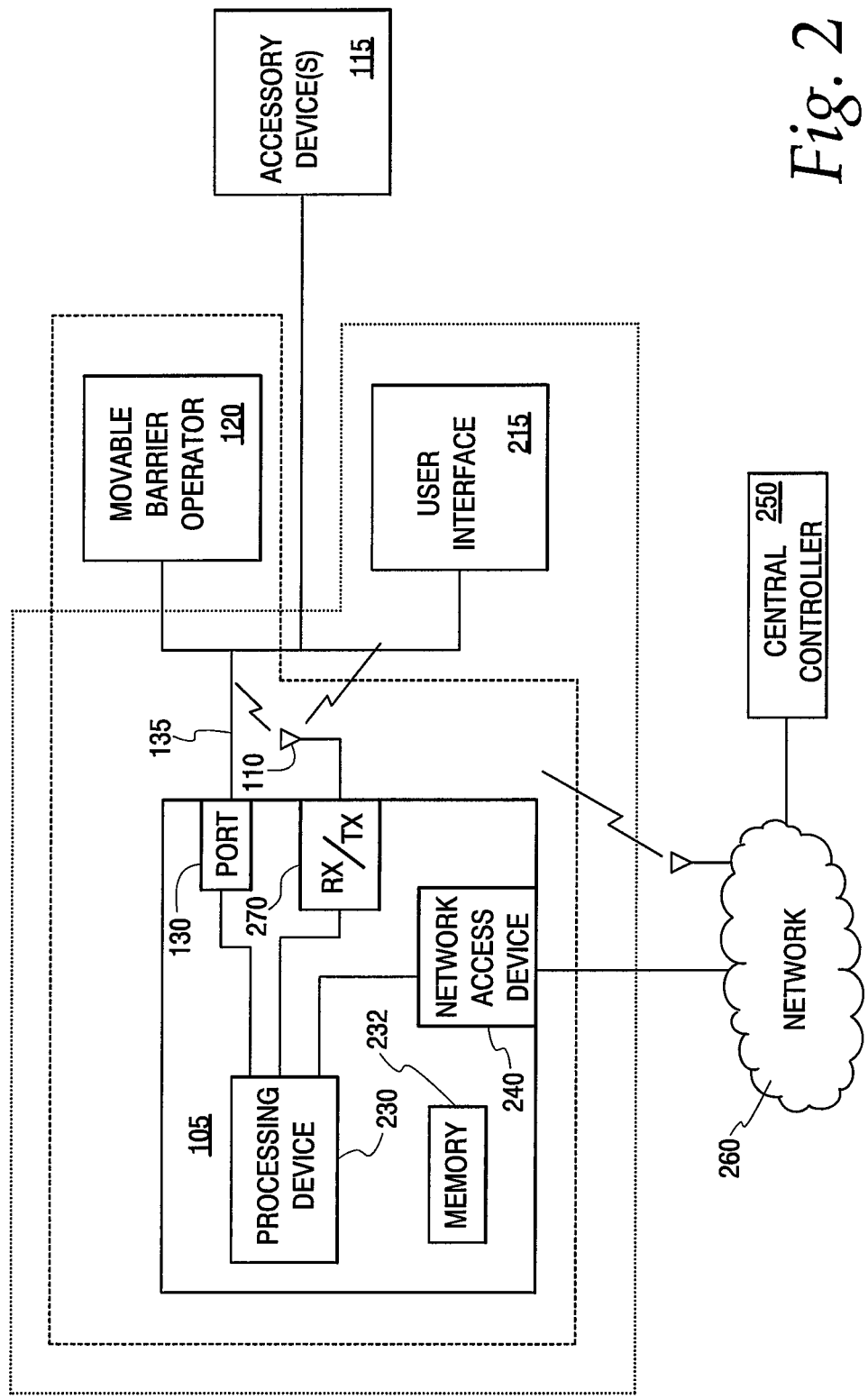
FIG. 2 comprises a block diagram of an example gateway device in a communication environment as configured in accordance with various embodiments of the invention.

Referring now to the drawings, and in particular in to FIGS. 1 and 2, an illustrative apparatus that is compatible with many of these teachings will now be presented. A loading dock area 100 includes a gateway device 105 that includes an antenna 110 configured to communicate wirelessly with at least one of a plurality of accessory devices 115 associated with a movable barrier operator 120. Wireless communication can be performed using any reliable method including, for example, WIFI, WIMAX, LTR, BLUETOOTH, ZIGBEE, or other proprietary or public wireless communication method. The movable barrier operator is configured to be operatively connected to a movable barrier 125 to move the movable barrier 125 between an open position and a closed position. The gateway device 105 includes in lieu of or in addition to the antenna a port 130 configured to communicate with at least one of the plurality of accessory devices 115 via a wired connection 135. The wired connection 135 may include any reliable method such as, for example, Ethernet, power line based communication (where communication is carried out over power lines and potentially superimposed over power signals), serial communication, or other proprietary or public wired communication method.

The accessory devices 115 can include any device that would operate in the context of a movable barrier environment. Non-limiting examples of such accessory devices include a photoeye 140, safety edge 145, a dock light 150, an exterior controlled light 155, a lighting control 160, a dock leveler 165, a trailer lock 170, a controlled power outlet 175, one or more cameras 180 and 181, edge guards or dock seal 185, dock bumper 190, a dock stoplight 195, a microwave sensor 200, an area optical detector 205, and a loop detector 210. The lighting control 160 may be a separate control device or be incorporated into the movable barrier operator 120, user interface 215, or gateway device 105. The lighting controller 160 is configured to communicate with one or more lighting appliances to control their on/off and dimming states. The lighting controller 160 and lights 150 and 155 may be further configured such that the lighting controller 160 and determine quality information from the lights 150 and 155 such as the state of the lighting element and when a lighting element will need replacing.

A given movable barrier environment may also include a user interface device 215 that is configured to provide control options for a plurality of the accessory devices 115. The user interface 215 may be configured to be semi or permanently mounted near a given movable barrier 125 or may be configured to be a portable user interface 220 that can be carried around a dock area or residence so as to control accessory devices at more than one loading area or movable barrier. Another option includes running a user interface application on a separate general purpose computing device such as a smart phone or other portable device Referring again to the gateway device 105, it includes a processing device 230 configured to control communications with the plurality of accessory devices 115. Those skilled in the art will recognize and appreciate that such a processor can comprise a fixed-purpose hard-wired platform or can comprise a partially or wholly programmable platform. A memory device 232 can be included as well. All of these architectural options are well known and understood in the art and require no further description here. The gateway device 105 may also include a network access device 240 configured to communicatively connect the gateway device 105 to a central controller 250 over a network 260. The network access device 240 may communicate with the network 260 over a wire connection or wirelessly through the antenna 110 by communicating with a transceiver 270 located within the gateway device 105 and connected to the antenna 110. The network access device 240 can be any circuit or hardware/software combination that enables network communication over an intranet, the internet, or other network, either over a wired connection or a wireless connection. The central controller 250 can be any common computing device configured for communication over a network 260 and specially configured to communicate with the gateway device 105 as described herein.

Those skilled in the art will recognize and understand that such an apparatus as the gateway device 105 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

Figure 3:
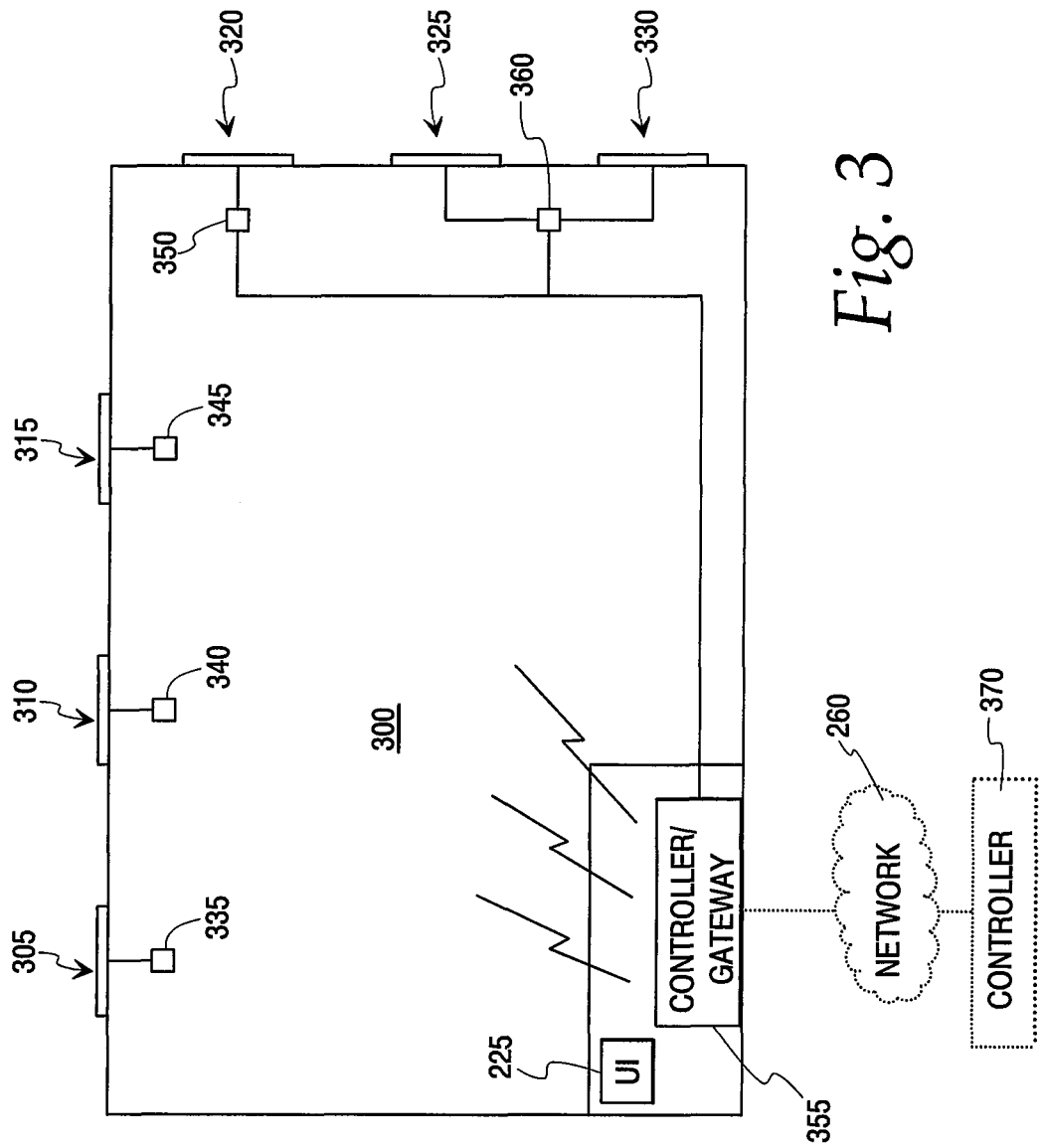
FIG. 3 comprises a plan view of an example loading dock as configured in accordance with various embodiments of the invention.

With reference to FIG. 3, a loading dock area 300 includes multiple loading docks 305, 310, 315, 320, 325, and 330. Loading docks 305, 310, and 315 each have separate communications hubs 335, 340, and 345. Loading dock 320 includes a communication hub 350 that is wired to a controller or gateway 355. Loading docks 325 and 330 share a communication hub 360 that is wired to the controller or gateway 355. The controller/gateway 355 in this example is configured to communicate wirelessly with communication hubs 335, 340, and 345. The communication hubs 335, 340, 345, 350, and 360 channel communications between the controller/gateway 355 and their respective movable barrier areas. The hubs 335, 340, 345, 350, and 360 in one example are gateway devices as described herein configured to communicate with a central controller such as the controller/gateway 355, whereas in other examples the hubs 335, 340, 345, 350, and 360 are merely relays between the movable barrier areas and the controller/gateway 355. The controller/gateway 355 is located in a room separate from the general loading dock area 300 with a user interface device 225 configured to control the movable barrier operator and accessory devices associated with each of the loading docks 305, 310, 315, 320, 325, and 330. Optionally, the controller or gateway device 355 can communicate with the network 260 and through the network 260 with a separate controller 370. The separate controller 370 in one aspect is configured to coordinate and monitor two or more loading dock areas.

It is within these various operations and frameworks that the processing device 230 of the gateway device 105 can be configured to control communications with the plurality of accessory devices 115 in a variety of ways as shown in FIGS. 4, 5, and 6. These figures illustrate example approaches for the gateway device 105 to receive control signals and send command signals to command one or more accessory devices 115. Referring to FIG. 4, a gateway device 105 receives an accessory device control signal and in turn sends a rolling code based accessory device command signal to an accessory device 115. In this example, the accessory device control signal is not necessarily encrypted using a rolling code encryption scheme. However, the communication between the gateway device 105 and the accessory device 115 is encrypted with a rolling code encryption scheme to provide additional security for that portion of the communication. The rolling code encryption used for an accessory device command signal may also include addressing schemes to help address command signals to individual accessory devices to further simplify the communication process with the plurality of accessory devices.

With reference to FIG. 5, the gateway device 105 receives a rolling code based accessory device control signal and in turn sends a command signal to an accessory device 115. In this example, the command signal that commands the accessory device 115 does not have a rolling code based encryption scheme, whereas the accessory device control signal received by the gateway device 105 does have a rolling code based encryption scheme. Generally speaking, the accessory device control signal may be sent by any of a variety of control devices, such as a user interface device that is specific to a particular accessory device or is a general user interface device used to control multiple accessory devices. When using rolling code encryption for the accessory device control signal, addressing schemes may be rolled into the encryption to help the gateway device 105 securely route command signals to specific accessory devices 115.

With reference to FIG. 6, the gateway device 105 receives a rolling code based accessory device control signal and in turn sends a rolling code based accessory device command signal to one or more accessory devices 115. In this example, both the device control signal received by the gateway device 105 and the command signal sent by the gateway device 105 to an accessory device 115 are rolling code encrypted to increase security of communication with the plurality of accessory devices.

Referring again to FIGS. 1-3, the processing device 230 in one aspect is configured to control communications with the plurality with accessory devices 115 by receiving an accessory device control signal designed to implement a function of one of the plurality of accessory devices 115, and triggering sending a rolling code based accessory command signal to one of the plurality of accessory devices 115 and/or the movable barrier operator 120. This approach parallels that of FIG. 4. In this approach, the one of the plurality of accessory devices 115 is configured to receive the rolling code based accessory command signal and derive a rolling code from the rolling code based accessory command signal. The one of the plurality of accessory devices 115 is further configured to determine whether the rolling code is a valid rolling code and, in response to determining whether the rolling code is a valid rolling code, implement the function.

The function to be implemented by the one of the plurality of accessory devices will vary depending upon the type of accessory device being targeted and the capabilities of that accessory device. For example, the function may include executing a system command such as opening or closing the barrier, turning on and off dock lights, execute a camera function, or the like. Other non-limiting examples of system commands are as follows: Barrier operator—open, Barrier operator—close, Barrier operator—Change state, Barrier operator—Status request, Barrier operator—Fault request, Photo eye—status request, Photo eye—Fault request, Safety Edge—status request, Safety Edge—Fault request, Dock light—turn on, Dock light—turn off, Dock Light—Status request, Dock light—Fault request, Area light—turn on, Area light—turn off, Area Light—Status request, Area light—Fault request, Dock leveler—Status request, Dock leveler—Weight request, Dock leveler—Fault request, Trailer lock—Status request, Controlled power outlet—Status request, Camera Status request, Camera Record, Edge guards/Dock seal—Status request, Dock Bumper—Status request, and Dock Stoplight—Status request.

Another function to be implemented by an accessory device includes sending back status information in response to receiving the command signal. Non-limiting examples of information to be sent back are as follows: trailer or container identification, driver identification, Current or power used, Barrier operator—number of operations, Barrier operator—door positional status, Barrier operator—failed to complete a command, Barrier operator—forces to open, Barrier operator—obstructed, Barrier operator—reversed due to contact with an obstruction, Barrier operator—reversed due to non-contact detection of a obstruction, Barrier operator—internal fault detected, Barrier operator—internal fault identification, Barrier operator—normal, Photo eye—Obstruction, Photo eye—Fault, Photo eye—Fault identification, Photo eye—Obstruction remaining, Photo eye—normal, Safety edge—obstruction, Safety edge—obstruction remaining, Safety edge—Fault, Safety edge—Fault identification, Safety edge—Normal, Dock Light—Status (on off), Dock Light—Bulb Status (Alive dead), Area lighting—Status (on Off), Area lighting—Bulb Status (all Alive One or more dead need service), Dock leveler—Set, Dock leveler—Weight detected, Dock leveler—Released, Dock leveler—Set, Trailer lock—Released, Trailer lock—Set, Controlled power outlet Active, Controlled power outlet—Deactivated, Camera—not active, Camera—motion activated, Camera—system activated, Edge guards/Dock seal—Compressed (vehicle detected), Edge guards/Dock seal—Not Compressed (vehicle absent pulled in wrong), Dock Bumper impacted (check for damage), and Dock stop-light (Red or Green).

So configured, the gateway device 105 supports unidirectional and bidirectional communication with the movable barrier operator 120 and any of the accessory devices 115. In a unidirectional setting, the gateway device 105 sends command signals to the one or more targeted devices to effect a function without expecting or listening for a response communication. In a bidirectional communication setting, the gateway device 105 sends command signals to the one or more targeted devices and is configured to receive return communications from the targeted devices. The gateway device 105 in another aspect can be configured to receive such communications from the movable barrier operator 120 and accessory devices 115 without having first prompted the communication through sending a command signal. For example, certain accessory devices can be configured to report certain conditions in response to detecting such conditions such that the gateway device 105 can then rely such information to a user interface device 215, 220, or 225 or a central controller 250.

Referring again to FIGS. 1 and 2, the user interface 215, 220, or 225 is configured to receive a user signal regarding the control options and, in response to receiving the user signal, send the accessory device control signal to the gateway device 105. Accordingly, a user can use the user interface device 215 to review the various functions available for the various accessory devices 115 and select which of the functions to execute. The user interface 215, 220, or 225 in turn sends the accessory device control signal to the gateway device 105, which in response to receiving the accessory device control signal, sends a rolling code based accessory command signal to the one of the plurality of accessory devices 115.

In one approach, the gateway device 105 stores (for example in the memory device 232) and updates the rolling code each time the gateway device 105 sends a rolling code based accessory command signal to the one of the plurality of accessory devices 115. The rolling code may be updated with each sending of a rolling code based accessory command signal to any of the plurality accessory devices or, in another approach, separate rolling codes may be stored wherein each rolling code corresponds to an individual one of the plurality of accessory devices. In the second approach, the rolling code based accessory command signal comprises an accessory specific rolling code having a corresponding rolling code number tracked at the one of the plurality of accessory devices 115.

More specifically, in one example rolling code encryption configuration, an encrypted rolling code, a plurality of differing data bit order patterns, and a plurality of differing data inversion patterns are provided. One selects a particular one of each of the bit order patterns and the data inversion patterns to provide selected patterns and then uses those selected patterns as transmission characteristics when transmitting at least part of the encrypted rolling code.

By these teachings, for example, a gateway device can be provided with data to be transmitted, where that data comprises, at least in part, at least portions of an encrypted rolling code and where that data comports with a particular data bit order pattern and a particular data inversion pattern as a function of a given portion of that rolling code. That data can then be transmitted in combination with the given portion of the encrypted rolling code wherein that given portion of the rolling code is not transmitted with any of its bits reordered or inverted as a function of the given portion itself. Accordingly, a receiver such as a movable barrier operator 120 or accessory device 115 that receives the data can then properly recover the re-ordered/inverted portions of the encrypted rolling code as a function of the given portion of the encrypted rolling code. If desired, this process will also optionally accommodate providing a fixed code. This fixed code can vary with the needs, requirements, and/or opportunities of a given application setting, but can, for example, comprise a value that is substantially unique to a given transmitter and hence comprises a value that will serve to identify that given transmitter. By another approach, the fixed code may indicate an address for the device for which accompanying control information is intended.

This encryption configuration also provides a plurality of differing data bit order patterns. By one approach, for example, this can comprise data bit order patterns that each comprise a pattern for exactly three bits. As will be shown below, this can be particularly beneficial when used in conjunction with bit pairs that correlate to corresponding ternary data. Similarly, this process provides a plurality of different data inversion patterns. As before, if desired, this can comprise providing patterns that each comprise a pattern for exactly three bits. The number of patterns provided in either case can vary as desired. By one approach, however, this can comprise providing at least nine different bit order patterns and nine different data inversion patterns.

This encryption configuration then provides for selecting a particular one of each of the data bit order patterns and the data inversion patterns to provide resultant corresponding selected patterns. There are various ways by which such selections can be made. By one approach, one may use a predetermined portion of the previously provided encrypted rolling code to inform the making of these selections. For example, this can comprise using a predetermined four bit pairs of the encrypted rolling code as a basis for selecting the particular data bit order pattern and the particular data inversion pattern. As another example in this regard, in combination with the foregoing or in lieu thereof, this can comprise using a first predetermined portion of the encrypted rolling code to select a first particular data bit order pattern and a first data inversion pattern and using a second predetermined portion of the encrypted rolling code (that is, for example, discrete with respect to the first predetermined portion of the encrypted rolling code though this is not a fundamental requirement) to select a second particular data bit order pattern and a second data inversion pattern.

This process then provides for transmitting at least a part of the encrypted rolling code itself (as well as at least a part of the above-described fixed code when present) using the aforementioned selected patterns as transmission characteristics. By one approach this can comprise making such a transmission using Manchester encoding as is known in the art.

So configured, a first portion of a joint message is seen to include a recovery indicator that itself comprises a selected portion of an encrypted rolling code. A second portion of that joint message, in turn, contains data triplets having bits that are arranged in a particular order and that observe a particular inversion pattern as a function of that joint indicator. Accordingly, it will not be sufficient for an unauthorized party to simply glean, in some fashion, the basis of the rolling code itself. Instead, now, this unauthorized party must also now understand how a particular portion of that rolling code is used to modify the transmission of other portions of that rolling code in addition to fixed information as may also accompany the rolling code to be able to steal addressing or substantive information as may be transmitted.

In one example, the processing device 230 is configured to control communications with the plurality of accessory devices 115 by validating the accessory device control signal and in response to validating the accessory device control signal, triggering sending the rolling code based accessory command signal to the one of the plurality of accessory devices 115. Validating includes confirming that the accessory device control signal is a valid signal and determining the requested function to be performed by the particular one or more of the accessory devices. This process may further include the processing device 230 being further configured to control communications with the plurality of the accessory devices 115 by determining an address of the one of the plurality accessory devices 115 based on the accessory device control signal. When using the address, the processing device 230 of the gateway device 105 is able to create the rolling code based accessory command signal including a proper address to trigger the proper function by the correct accessory device.

In another example, the processing device 230 is configured to access the central controller 250 to receive a rolling code on which the rolling code based accessory command signal is based instead of determining the rolling code internally to the gateway device 105. Other functions of the gateway device 105 as described above may be performed in conjunction with or by the central controller 250. For example, in one aspect, the processing device 230 can be configured to control communications with the plurality of accessory devices 115 by accessing the central controller 250 to validate the accessory device control signal and, in response to validating the accessory device control signal, triggering sending the rolling code based accessory command signal to the one of the plurality of accessory devices 115. In other words, various aspects of validating the accessory device control signal and creating the rolling code based accessory command signal may be performed at the gateway device 105 and/or at the central controller 250.

The processing device 230 of the gateway device 105 may, in addition to being configured to receive accessory device control signal designed to implement a function of the one of the plurality of accessory devices, may also be configured to control communications with the plurality of accessory devices by receiving a rolling code based accessory device control signal design to implement the function of the one plurality of accessory devices. In this approach, the processing device is further configured to derive a rolling code from the rolling code based accessory device control signal, to determine whether the rolling code is a valid rolling code, and, in response to determining whether the rolling code is a valid rolling code, triggering sending the rolling code based accessory command signal to the one of the plurality of accessory devices.

So configured, the gateway device 105 can receive both rolling code based and non-rolling code based accessory device control signals and, in response to receiving either type of accessory device control signal, send a rolling code based accessory command signal to trigger implementation or execution of the requested function by one or more accessory devices. In one aspect, the rolling code based accessory device control signal includes a movable barrier specific rolling code having a corresponding rolling number tracked at one of the gateway device 105 or a central controller 250 and specific to the movable barrier 125 with which the plurality of accessory devices 115 are associated. In this aspect, the movable barrier specific rolling code will roll or change with every rolling code based accessory device control signal sent to the gateway device 105 associated with the movable barrier 125.

As discussed above, various ones of the validating, receiving, and sending aspects of the gateway device 150 may be performed with other devices or in conjunction with other devices, such as the central controller 250 or the user interface 215. Such examples include wherein the processing device 230 is further configured to control communications with the plurality of accessory devices 115 by receiving a rolling code based accessory device control signal designed to implement the function of the one of the plurality of accessory devices 115 and deriving a rolling code from the rolling code based accessory device control signal. In this aspect, the processing device 230 accesses the central controller 250 to determine whether the rolling code is a valid rolling code and in response to determining that the rolling code is a valid rolling code, triggering sending the rolling code based accessory command signal to the one of the plurality of accessory devices 115.

In still another example, the processing device 230 is further configured to control communications with the plurality of accessory devices 115 by receiving a rolling code based accessory device control signal designed to implement a function of a second of the plurality of accessory devices 115 and deriving a rolling code from the rolling code based accessory command signal. In this aspect, the processing device 230 determines whether the rolling code is a valid rolling code and in response, to determining that the rolling code is a valid rolling code, triggering sending a command signal to the second of the plurality of accessory devices. In this aspect, the second of the plurality of accessory devices 115 is configured to receive the command signal and, in response to receiving the command signal, implement the function. In still another example, the processing device 230 is configured to control communications with the plurality of accessory devices 115 by receiving a rolling code based accessory device control signal designed to implement a function of a second of the plurality of accessory devices and deriving a rolling code from the rolling code based accessory command signal. The processing device is further configured to access the central controller 250 to determine whether the rolling code is a valid rolling code and, in response to determining that the rolling code is a valid rolling code, triggering sending a command signal to the second of the plurality of accessory devices 115. With this aspect, the second of the plurality of accessory control devices 115 is configured to receive the command signal and, in response to receiving the command signal, implement the requested function.

The apparatus as described above is configured in the first instance to operate under the signaling approach described in FIG. 4, wherein the system can be modified to, in addition to such signaling, also perform signaling such that described in FIGS. 5 and 6. In other examples, the apparatus may be configured to operate in the first instance in accordance with the signaling flows described in either FIG. 5 or FIG. 6 with further modifications to accommodate the other signaling flows. For example, an example gateway device 105 may include a processing device 230 configured to control communications with the plurality of accessory devices 115 by receiving a rolling code based accessory device control signal designed to implement a function of one of the plurality of accessory devices 115 and triggering sending a command signal to the one of the plurality of accessory devices 115 to effect implementation of the function. This approach can be implemented, for example, in a retrofitted situation where various accessory devices 115 are not configured to operate in response to or receive and understand rolling code based command signals. Therefore, the security provided by using a rolling code based encryption can still be implemented in the signaling between a user interface device and a gateway device 105 wherein the gateway device can then communicate with a legacy accessory device using the legacy accessory devices particular command signaling. In this example, the gateway device 105 may also communicate with other accessory devices using a rolling code based accessory device command signal where the target accessory devices are configured to receive and operate in response to such rolling code based signaling.

So configured, a complicated movable barrier operator environment can operate securely and in an integrated fashion to improve overall performance of the movable barrier system. For instance, safety and security are improved through central control and notification of movable barrier or door status (open, closed, moving), sensor status (such as photo eye, safety edges, and the like), and other accessory device control including that of the lights, dock leveler, trailer lock, and the like. All this information can be available to an operator at a user interface device and stored for operation management. For example, throughput at a loading bay can be monitored and improved by tracking the time truck was in the bay (from operator status, proximity sensors, red light status, seal status, time the door was open, time the door was closed, time when the dock levelers was moved, or power from aux lights outlet). Security is improved by integrating access control requests and verification and additional implemented features. For instance, truck driver identification can be read by microwave sensors or other sensors, container identification can be read by microwave sensors or other sensors, cameras can be activated in response to sensing engagement by the safety edge, and lighting and camera activation can be triggered in response to sensing certain or any activity by motion detector or other detector. Other examples include opening the movable barrier in response to sensing sealing of the opening by door seals and the lighting can be controlled based on a status of the dock operator. Maintenance functions can be streamlined by automatically receiving status updates regarding device power, device cycle usage, changes in power draw, and the like. All of which can be communicated to the gateway device for consolidation and triggering responsive actions.

Figure 7:
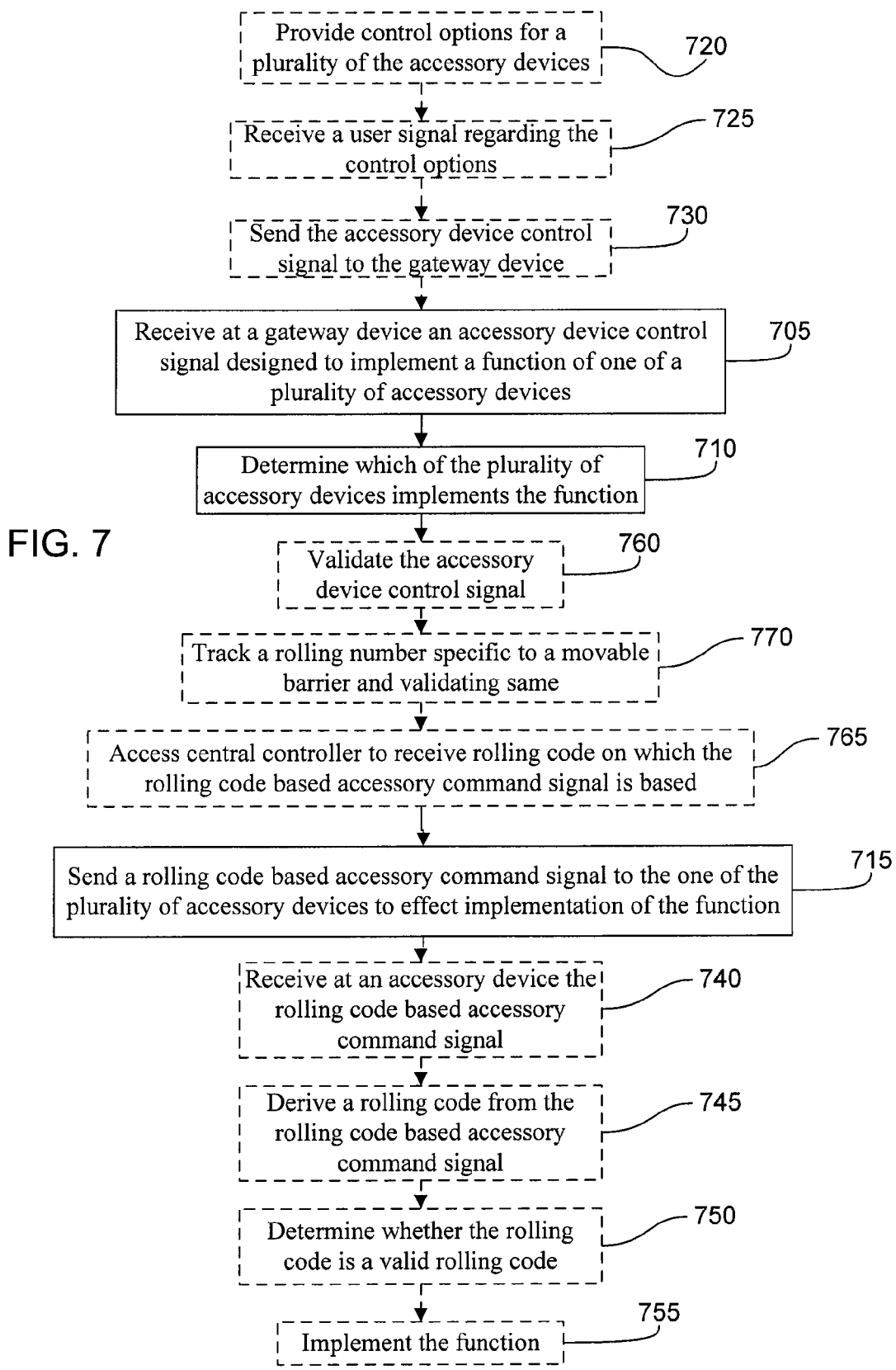
FIGS. 7, 8, 9, and 10 comprise flow diagrams of various methods as configured in accordance with various embodiments of the invention.

The apparatuses as described above can be configured to perform various methods including the example methods illustrated in FIGS. 7-10. Turning to FIG. 7, this example method (which in the first instance corresponds to the approach of FIG. 4) includes receiving 705 at a gateway device 105 from a user interface 215, 220 or 225 an accessory device control signal designed to implement a function of one of the plurality of accessory devices associated with a movable barrier operator 120. The gateway device 105 is configured to send control signals to the movable barrier operator 120 to effect movement of a movable barrier 125 between an open position and a closed position. The method also includes determining 710 which of the plurality of accessory devices 115 implements the function. In one aspect, the gateway device 105 controlling communications with the plurality of accessory devices 115 does so by determining an address of the one of the plurality accessory devices 115 based on the accessory device control signal.

The method further includes at 715 sending a rolling code based accessory command signal to the one of the plurality of accessory devices 115 to effect implementation of the function. In one aspect, the rolling code based accessory command signal may include an accessory specific rolling code wherein the method further includes tracking a corresponding rolling number at the one of the plurality of accessory devices 115. The method may also include controlling a second of the plurality accessory devices 115. In this aspect, the method includes receiving a rolling code based accessory device control signal designed to implement a function of a second of a plurality of accessory devices 115 and deriving a rolling code from the rolling code based accessory command signal. The method also includes determining whether the rolling code is a valid rolling code and, in response determining that the rolling code is a valid rolling code, sending a command signal to the second of the plurality accessory devices.

The method may also include a user interface's 215, 220 or 225 providing 720 control operations for a plurality of the accessory devices 115 and receiving 725 a user signal regarding the control options. In response to receiving the user signal, the method includes at 730 sending the accessory device control signal to the gateway device 105. The method may also include the one of the plurality of accessory devices 115 receiving 740 the rolling code based accessory command signal and deriving 745 a rolling code from the rolling code based accessory command signal. The accessory device 115 determines 750 whether the rolling code is a valid rolling code and, in response determining that the rolling code is a valid rolling code, implementing 755 the function.

Other optional steps may be included in the method as well. For example, the method can include validating 760 the accessory device control signal and, in response to validating the accessory device control signal, at 715 sending the rolling code based accessory command signal to one of the plurality accessory devices 115. In another optional aspect, the gateway device 105 can access 765 a central controller 250 to receive a rolling code on which the rolling code based accessory command signal is based. Other aspects of the method can be performed in conjunction with or by the central controller 250. For instance, the gateway device 115 can control communications with the plurality of accessory devices by accessing the central controller 250 to validate the accessory device control signal and, in response to validating the accessory device control signal, triggering sending the rolling code based accessory command signal to the one of the plurality of accessory devices 115. Moreover, accessing the central controller 250 can be part of communicating with a second one of the plurality of the accessory devices 115. In this aspect, the gateway device 105 controlling communications with the plurality of accessory devices 115 does so by receiving a rolling code based accessory device control signal designed to implement a function of a second of a plurality of accessory devices 115, deriving a rolling code from the rolling code based accessory command signal, accessing a central controller 250 to determine whether the rolling code is a valid rolling code, and, in response to determining that the rolling code is a valid rolling code, sending a command signal to the second of the plurality accessory devices 115.

In a still further optional modification of the method of FIG. 7, the gateway device 105 can control communications with the plurality of accessory devices by receiving a rolling code based accessory device control signal designed to implement the function of the one of the plurality of accessory devices 115 as opposed to receiving just an accessory device control signal that is not rolling code encrypted. In this aspect, the gateway device 105 derives a rolling code from the rolling code based accessory device control signal, determines whether the rolling code is a valid rolling code, and, in response to determining that the rolling code is a valid rolling code, sends the rolling code based accessory command signal to the one of the plurality of accessory devices. Optionally, the gateway device can access the central controller 250 to determine whether the rolling code is a valid rolling code, and in another optional modification, the rolling code based accessory device control signal can include a movable barrier specific rolling code. In this aspect, the method further includes tracking 770 a corresponding rolling number at one of the gateway device or the central controller 250 where the corresponding rolling number is specific to the movable barrier with which the plurality of accessory devices are associated.

Figure 8:
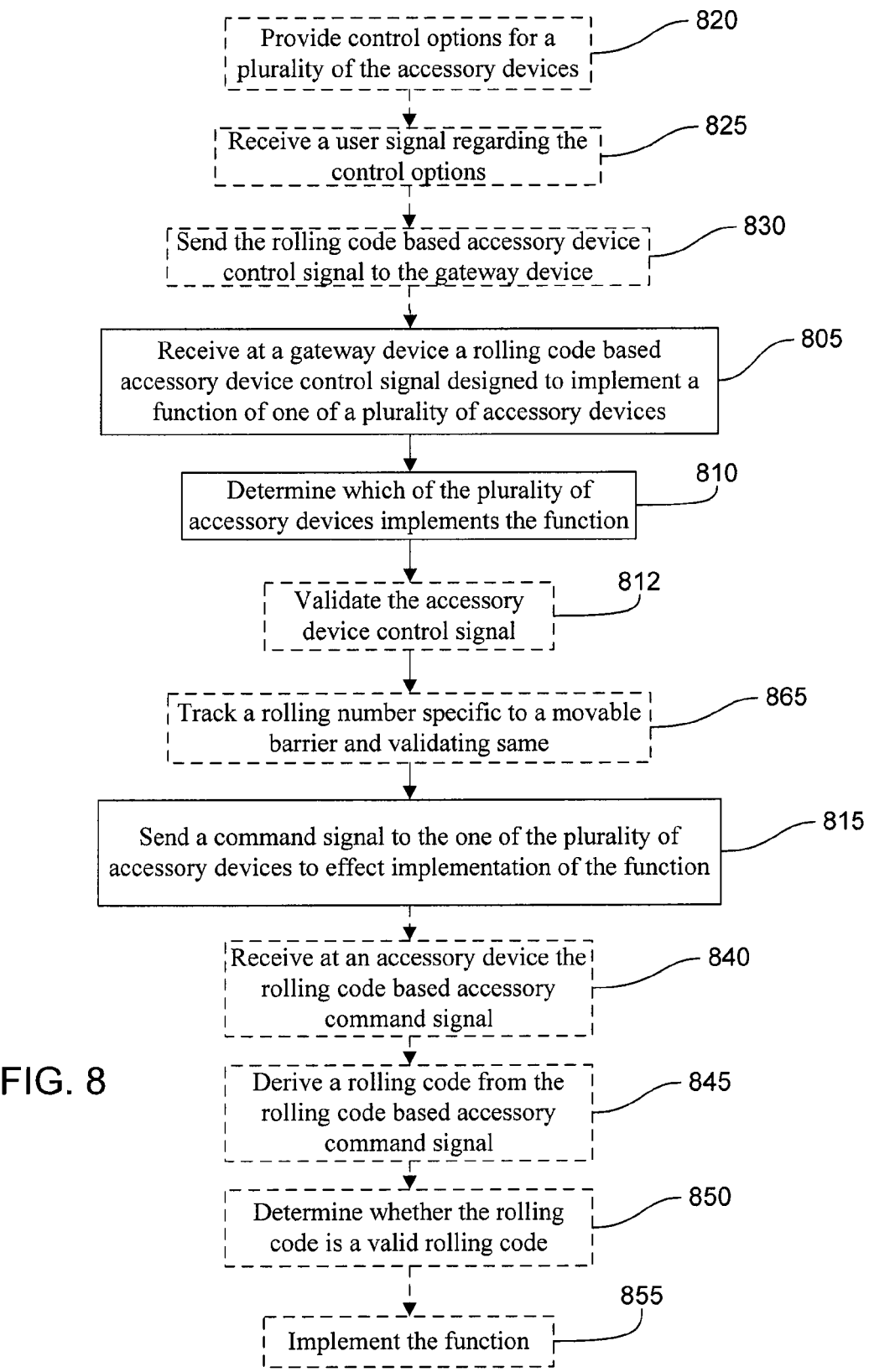

With reference to FIG. 8, another example method (which in the first instance corresponds to the approach of FIG. 5) includes receiving 805 at a gateway device 105 from a user interface 215, 220 or 225 a rolling code based accessory device control signal designed to implement a function of one of the plurality of accessory devices associated with a movable barrier operator 120. The method also includes determining 810 which of the plurality of accessory devices 115 implements the function. In one aspect, the gateway device 105 does so by determining an address of the one of the plurality accessory devices 115 based on the accessory device control signal, for example, by reviewing information included in the accessory device control signal. In an optional step 812, the gateway device 105 validates the accessory device control signal. For example, the validation 812 can include checking the rolling code portion of the rolling code based accessory device control signal. In another approach, the gateway device controlling communications with the plurality of accessory devices does so by accessing a central controller to validate the rolling code based accessory device control signal.

In response to receiving the rolling code based accessory device control signal, and optionally validating the signal, the method further includes at 815 sending a command signal to the one of the plurality of accessory devices 115 to effect implementation of the function. The method may also include controlling a second of the plurality accessory devices 115. In this aspect, the method includes receiving a rolling code based accessory device control signal designed to implement a function of a second of a plurality of accessory devices 115 and deriving a rolling code from the rolling code based accessory command signal. The method also includes determining whether the rolling code is a valid rolling code and, in response determining that the rolling code is a valid rolling code, sending a command signal to the second of the plurality accessory devices.

The method may also include a user interface's 215, 220 or 225 providing 820 control operations for a plurality of the accessory devices 115 and receiving 825 a user signal regarding the control options. The user interface device can provide control options by displaying control options or otherwise communicating control options to a user or other computing device that can initiate sending a user triggered signal to indicate selection of a control option to be conveyed to a controlled device. In response to receiving the user signal, the method includes at 830 sending the rolling code based accessory device control signal to the gateway device 105. The method may also include the one of the plurality of accessory devices 115 receiving 840 the command signal.

Other optional steps may be included in the method as well. Other aspects of the method can be performed in conjunction with or by the central controller 250. For instance, the gateway device 115 can control communications with the plurality of accessory devices by accessing the central controller 250 to validate the accessory device control signal and, in response to validating the accessory device control signal, triggering sending the command signal to the one of the plurality of accessory devices 115. Moreover, accessing the central controller 250 can be part of communicating with a second one of the plurality of the accessory devices 115. In this aspect, the gateway device 105 controlling communications with the plurality of accessory devices 115 does so by receiving a rolling code based accessory device control signal designed to implement a function of a second of a plurality of accessory devices 115, deriving a rolling code from the rolling code based accessory command signal, accessing a central controller 250 to determine whether the rolling code is a valid rolling code, and, in response to determining that the rolling code is a valid rolling code, sending a command signal to the second of the plurality accessory devices 115.

In a still further optional modification of the method of FIG. 8, the gateway device 105 can control communications with the plurality of accessory devices by sending a rolling code based accessory command signal designed to implement the function of the one of the plurality of accessory devices 115 as opposed to sending just a command signal that is not rolling code encrypted. In this aspect, the rolling code based accessory command signal may include an accessory specific rolling code wherein the method further includes tracking a corresponding rolling number at the one of the plurality of accessory devices 115. In still another aspect the accessory device receives 840 the rolling code based accessory command signal, derives 845 a rolling code from the rolling code based accessory command signal, and determines 850 whether the rolling code is a valid rolling code, and, in response determining that the rolling code is a valid rolling code, implementing 855 the function. In still another optional aspect, the gateway device 105 can access a central controller 250 to receive a rolling code on which the rolling code based accessory command signal is based. Optionally, the rolling code based accessory device control signal can include a movable barrier specific rolling code. In this aspect, the method further includes tracking 865 a corresponding rolling number at one of the gateway device or the central controller 250 where the corresponding rolling number is specific to the movable barrier with which the plurality of accessory devices are associated.

Figure 9:
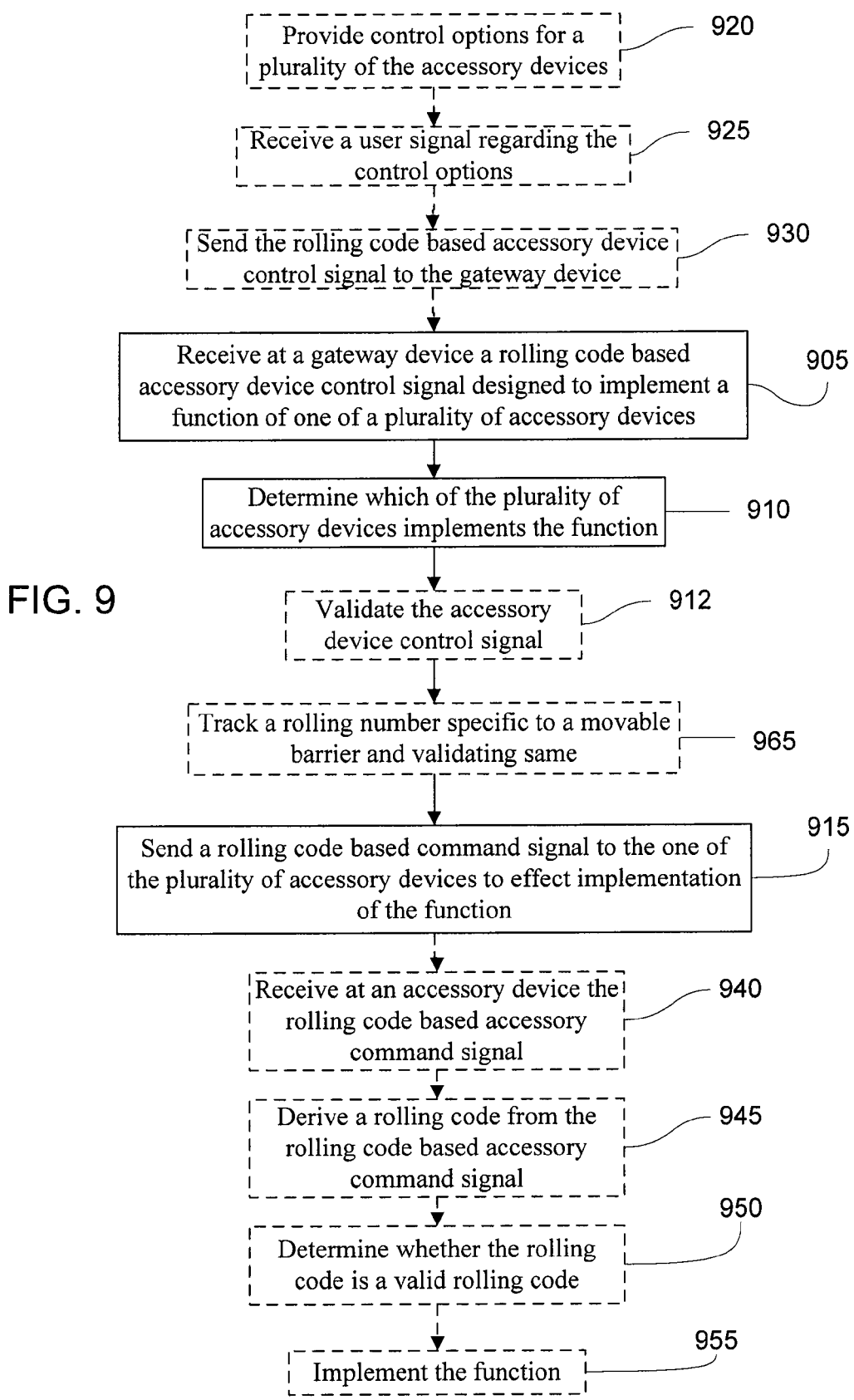

With reference to FIG. 9, another example method (which in the first instance corresponds to the approach of FIG. 6) includes receiving 905 at a gateway device 105 from a user interface 215, 220 or 225 a rolling code based accessory device control signal designed to implement a function of one of the plurality of accessory devices associated with a movable barrier operator 120. The method also includes determining 910 which of the plurality of accessory devices 115 implements the function. In one aspect, the gateway device 105 does so by determining an address of the one of the plurality accessory devices 115 based on the accessory device control signal, for example, by reviewing information included in the accessory device control signal. In an optional step 912, the gateway device 105 validates the accessory device control signal. For example, the validation 912 can include checking the rolling code portion of the rolling code based accessory device control signal. In another approach, the gateway device controlling communications with the plurality of accessory devices does so by accessing a central controller to validate the rolling code based accessory device control signal.

In response to receiving the rolling code based accessory device control signal, and optionally validating the signal, the method further includes at 915 sending a command signal to the one of the plurality of accessory devices 115 to effect implementation of the function. In one aspect, the rolling code based accessory command signal may include an accessory specific rolling code wherein the method further includes tracking a corresponding rolling number at the one of the plurality of accessory devices 115. The method may also include controlling a second of the plurality accessory devices 115. In this aspect, the method includes receiving a rolling code based accessory device control signal designed to implement a function of a second of a plurality of accessory devices 115 and deriving a rolling code from the rolling code based accessory command signal. The method also includes determining whether the rolling code is a valid rolling code and, in response determining that the rolling code is a valid rolling code, sending a command signal to the second of the plurality accessory devices.

The method may also include a user interface's 215, 220 or 225 providing 920 control operations for a plurality of the accessory devices 115 and receiving 925 a user signal regarding the control options. In response to receiving the user signal, the method includes at 930 sending the rolling code based accessory device control signal to the gateway device 105. The method may also include the one of the plurality of accessory devices 115 receiving 940 the command signal and deriving 945 a rolling code from the rolling code based accessory command signal. The accessory device 115 determines 950 whether the rolling code is a valid rolling code and, in response determining that the rolling code is a valid rolling code, implementing 955 the function.

In an optional modification of the method of FIG. 9, the gateway device 105 can control communications with the plurality of accessory devices by receiving non-rolling code encrypted accessory control signals and/or sending a non-rolling code based accessory command signal designed to implement the function of the one of the plurality of accessory devices 115, which approaches are described above.

So configured, the gateway device 105 allows for coordination and integration among the various devices through securely encrypted and addressed communications. Such coordination provides for system functional integration wherein operation or functioning of certain devices can be made conditional on the status of other devices. This is possible because communication with each of the accessory devices 115 is performed through the gateway device 105 such that the gateway device 105, or a central controller 250 in communication with the gateway device 105 or a combination of both, stores the status of each device.

Figure 10:
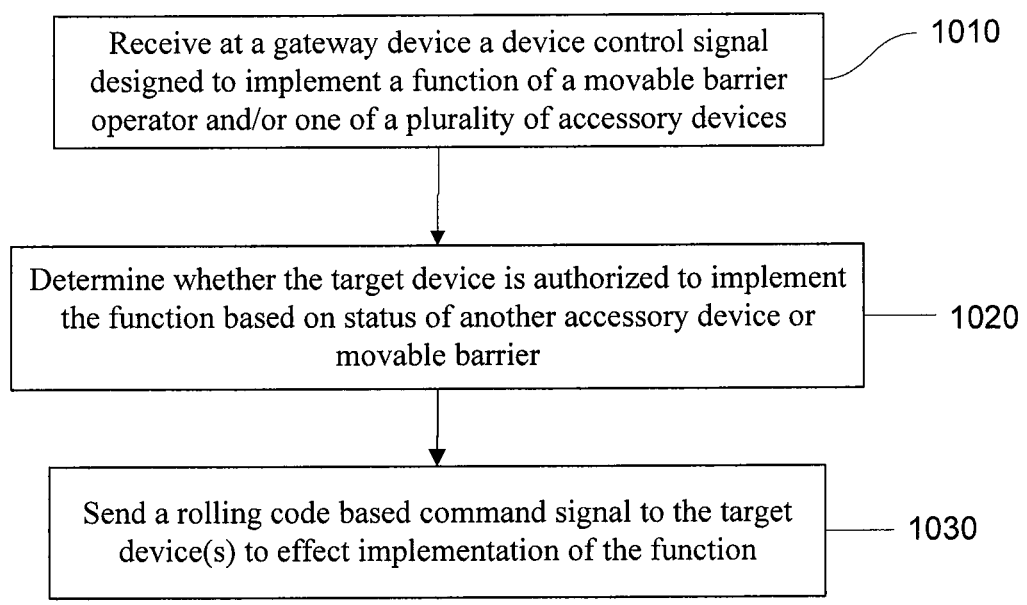

Many examples of coordination among the accessory devices are applicable. With reference to FIG. 10, one example method of operating devices in a commercial door environment includes receiving 1010 at a gateway device 105 from a user interface 215, 220 or 225 a device control signal designed to implement a function of at least one of a movable barrier operator 120 or one of a plurality of accessory devices associated with the movable barrier operator 120. The process includes determining 1020 whether the one of the plurality of accessory devices 115 is authorized to implement the function based at least in part on a status of at least one of another accessory device or the movable barrier 125. Examples include determining that the photo eyes 140 are open before authorizing movement of the movable barrier 125, determining that the dock seal 185 is set and/or that the movable barrier 125 is open before authorizing unlocking of the trailer lock 170, determining that the light 150 is on before authorizing opening the movable barrier 125, and determining that the dock leveler is locked before authorizing turning on a green or go dock stoplight 195. In response to determining that the target device(s) is authorized to implement the function, sending a rolling code based command signal to the target device(s) to effect implementation of the function. If the gateway device 105 or central controller 250 determines that a particular configuration needed before executing a function is not present, optionally the gateway device 105 can send command signals to the effected devices to create the particular configuration needed to execute the function.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
    receiving at a gateway device from a user interface an accessory device control signal designed to implement a function of at least one target device, the at least one target device comprising at least one of a movable barrier operator or at least one of a plurality of accessory devices configured to operate in a movable barrier operator system and configured to communicate status information regarding the movable barrier operator system, the gateway device configured to send control signals to the movable barrier operator to effect movement of a movable barrier between an open position and a closed position;
    determining which of the at least one target device implements the function;
    receiving status information comprising a status of at least one other device that is not the target device;
    determining whether the at least one target device is authorized to implement the function based at least in part on the status of the at least one other device;
    sending a rolling code based accessory command signal to the at least one target device to effect implementation of the function;
    the gateway device controlling communications with the plurality of accessory devices by:
        receiving a rolling code based accessory device control signal designed to implement the function of the one of the plurality of accessory devices,
        deriving a rolling code from the rolling code based accessory device control signal,
        determining that the rolling code is a valid rolling code or accessing a central controller to determine whether the rolling code is a valid rolling code, and
        in response to determining that the rolling code is a valid rolling code, sending the rolling code based accessory command signal to the one of the plurality of accessory devices.

2. The method of claim 1 further comprising the user interface providing control options for a plurality of the accessory devices, receiving a user signal regarding the control options, and in response to receiving the user signal, sending the accessory device control signal to the gateway device.

3. The method of claim 1 further comprising the one of the plurality of accessory devices:
    receiving the rolling code based accessory command signal;
    deriving a rolling code from the rolling code based accessory command signal;
    determining whether the rolling code is a valid rolling code;
    in response to determining that the rolling code is a valid rolling code, implementing the function.

4. The method of claim 1 further comprising the gateway device accessing the central controller to receive a rolling code on which the rolling code based accessory command signal is based.

5. The method of claim 1 further comprising the gateway device controlling communications with the plurality of accessory devices by accessing a central controller to validate the accessory device control signal and in response to validating the accessory device control signal, triggering sending the rolling code based accessory command signal to the one of the plurality of accessory devices.

6. The method of claim 1 further comprising the gateway device controlling communications with the plurality of accessory devices by validating the accessory device control signal and in response to validating the accessory device control signal, sending the rolling code based accessory command signal to the one of the plurality of accessory devices.

7. The method of claim 1 wherein the rolling code based accessory device control signal comprises a movable barrier specific rolling code, the method further comprising tracking a corresponding rolling number at one of the gateway device or a central controller, the corresponding rolling number being specific to the movable barrier with which the plurality of accessory devices are associated.

8. The method of claim 1 further comprising the gateway device controlling communications with the plurality of accessory devices by:
    receiving a rolling code based accessory device control signal designed to implement a function of a second of the plurality of accessory devices,
    deriving a rolling code from the rolling code based accessory command signal,
    determining that the rolling code is a valid rolling code, and
    in response to determining that the rolling code is a valid rolling code, sending a command signal to the second of the plurality of accessory devices.

9. The method of claim 1 further comprising the gateway device controlling communications with the plurality of accessory devices by:
    receiving a rolling code based accessory device control signal designed to implement a function of a second of the plurality of accessory devices, deriving a rolling code from the rolling code based accessory command signal, accessing the central controller to determine whether the rolling code is a valid rolling code, and in response to determining that the rolling code is a valid rolling code, sending a command signal to the second of the plurality of accessory devices.

10. The method of claim 1 further comprising the gateway device controlling communications with the plurality of accessory devices by determining an address of the one of the plurality of accessory devices based on the accessory device control signal.

11. The method of claim 1 wherein the rolling code based accessory command signal comprises an accessory specific rolling code, the method further comprising tracking a corresponding rolling number at the one of the plurality of accessory devices.

12. A method comprising:

receiving at a gateway device from a user interface a rolling code based accessory device control signal designed to implement a function of at least one target device, the at least one target device comprising at least one of a movable barrier operator or at least one of a plurality of accessory devices configured to operate in a movable barrier operator system and configured to communicate status information regarding the movable barrier operator system, the gateway device configured to send control signals to the movable barrier operator to effect movement of a movable barrier between an open position and a closed position;

determining which of the at least one target device implements the function;

receiving status information comprising a status of at least one other device that is not the target device;

determining whether the at least one target device is authorized to implement the function based at least in part on the status of the at least one other device;

sending a rolling code based command signal to the at least one target device to effect implementation of the function;

the gateway device controlling communications with the plurality of accessory devices by:

deriving a rolling code from the rolling code based accessory device control signal, determining whether the rolling code is a valid rolling code or accessing a central controller to determine whether the rolling code is a valid rolling code, and in response to determining that the rolling code is a valid rolling code, sending the rolling code based command signal to the one of the plurality of accessory devices.

13. The method of claim 12 further comprising the gateway device controlling communications with the plurality of accessory devices by determining an address of the one of the plurality of accessory devices based on the rolling code based accessory device control signal.

14. The method of claim 12 further comprising the user interface providing control options for a plurality of the accessory devices, receiving a user signal regarding the control options, and in response to receiving the user signal, sending the rolling code based accessory device control signal to the gateway device.

15. The method of claim 12 further comprising the gateway device controlling communications with the plurality of accessory devices by accessing the central controller to validate the rolling code based accessory device control signal and in response to validating the accessory device control signal, sending the command signal to the one of the plurality of accessory devices.

16. The method of claim 12 further comprising the gateway device accessing a central controller to receive a rolling code on which the rolling code based accessory command signal is based.

17. The method of claim 12 wherein the rolling code based accessory device control signal comprises a movable barrier specific rolling code, the method further comprising tracking a corresponding rolling number at one of the gateway device or a central controller, the corresponding rolling number being specific to the movable barrier with which the plurality of accessory devices are associated.

18. The method of claim 12 wherein the rolling code based accessory command signal comprises an accessory specific rolling code, the method further comprising tracking a corresponding rolling number at the one of the plurality of accessory devices.

19. A method of operating devices in a movable door environment, the method comprising:

receiving at a gateway device from a user interface a device control signal designed to implement a function of at least one target device, the at least one target device comprising at least one of a movable barrier operator or at least one of a plurality of accessory devices configured to operate in a movable barrier operator system and configured to communicate status information regarding the movable barrier operator system;

receiving status information comprising a status of at least one other device that is not the target device;

determining whether the at least one target device is authorized to implement the function based at least in part on a status of the at least one other device;

in response to determining that the at least one target device is authorized to implement the function, sending a rolling code based command signal to the at least one target device to effect implementation of the function;

wherein the status information comprises information selected from group consisting of:

trailer identification, container identification, driver identification, current used, power used, barrier operator—number of operations, barrier operator—door positional status, barrier operator—failed to complete a command, barrier operator—forces to open, barrier operator—obstructed, barrier operator—reversed due to contact with an obstruction, barrier operator—reversed due to non-contact detection of an obstruction, barrier operator—internal fault detected, barrier operator—internal fault identification, barrier operator—normal, photo eye—obstruction, photo eye—fault, photo eye—fault identification, photo eye—obstruction remaining, photo eye—normal, safety edge—obstruction, safety edge—obstruction remaining, safety edge—fault, safety edge—fault identification, safety edge—normal, dock light—status, dock light—bulb status, area lighting—status, area lighting—bulb status, dock leveler—set, dock leveler—weight detected, dock leveler—released, dock leveler—set, trailer lock—released, trailer lock—set, controlled power outlet active, controlled power outlet—deactivated, camera—not active, camera—motion activated, camera—system activated, edge guards/dock seal—compressed, edge guards/dock seal—not compressed, dock bumper impacted, and dock stop-light.

20. The method of claim 1 wherein the at least one of a plurality of accessory devices is selected from group consisting of:

a photoeye,
a safety edge,
a light,
a lighting control,
a dock leveler,
a trailer lock,
a controlled power outlet,
a camera,
an edge guard,
a dock seal,
a dock bumper,
a microwave sensor,
an area optical detector, and a loop detector.

* * * * *